United States Patent
Batson et al.

(10) Patent No.: US 8,041,438 B2
(45) Date of Patent: Oct. 18, 2011

(54) DATA-DRIVEN MEDIA MANAGEMENT WITHIN AN ELECTRONIC DEVICE

(75) Inventors: James D. Batson, Saratoga, CA (US); Meriko L. Borogove, San Francisco, CA (US); Gregory R. Chapman, San Jose, CA (US); Patrick L. Coffman, Menlo Park, CA (US); Anthony J. Guetta, Palo Alto, CA (US); Aram Lindahl, Menlo Park, CA (US); Andrew Rostaing, San Francisco, CA (US)

(73) Assignee: Apple Inc., Cupertino, CA (US)

(*) Notice: Subject to any disclaimer, the term of this patent is extended or adjusted under 35 U.S.C. 154(b) by 920 days.

(21) Appl. No.: 11/824,320

(22) Filed: Jun. 28, 2007

(65) Prior Publication Data
US 2009/0005891 A1    Jan. 1, 2009

(51) Int. Cl.
| G06F 17/00 | (2006.01) |
| G06F 3/00  | (2006.01) |
| G06F 5/00  | (2006.01) |
| G06F 9/44  | (2006.01) |
| G06F 9/46  | (2006.01) |
| G06F 13/00 | (2006.01) |
| H04B 1/00  | (2006.01) |

(52) U.S. Cl. ............. 700/94; 381/119; 710/38; 719/329
(58) Field of Classification Search .................. 700/94; 381/119, 123; 455/3.06; 709/204; 710/5–7, 710/12, 14, 36–45; 719/318, 322, 329
See application file for complete search history.

(56) References Cited

U.S. PATENT DOCUMENTS

| 6,389,473 | B1 | 5/2002 | Carmel et al. |
| 6,574,471 | B1* | 6/2003 | Rydbeck ................. 455/418 |
| 6,859,845 | B2 | 2/2005 | Mate |
| 7,272,232 | B1* | 9/2007 | Donaldson et al. ........ 381/119 |
| 7,561,932 | B1 | 7/2009 | Holmes et al. |
| 7,653,203 | B2 | 1/2010 | Holmi et al. |
| 2002/0006785 | A1* | 1/2002 | Ohtsuki ................... 455/414 |
| 2002/0164155 | A1 | 11/2002 | Mate |
| 2003/0215098 | A1* | 11/2003 | Marumoto ............... 381/71.1 |
| 2005/0180578 | A1 | 8/2005 | Cho et al. |
| 2007/0019823 | A1 | 1/2007 | Miyazaki et al. |
| 2007/0203979 | A1* | 8/2007 | Walker et al. ............ 709/204 |
| 2007/0207733 | A1 | 9/2007 | Wong et al. |
| 2007/0283423 | A1 | 12/2007 | Bradley et al. |
| 2008/0183575 | A1 | 7/2008 | Kaplan et al. |
| 2008/0186960 | A1 | 8/2008 | Kocheisen et al. |
| 2008/0244050 | A1 | 10/2008 | Wong et al. |
| 2009/0003620 | A1 | 1/2009 | McKillop et al. |

(Continued)

OTHER PUBLICATIONS

U.S. Appl. No. 11/824,160, filed Jun. 28, 2007.
U.S. Appl. No. 12/405,212, filed Mar. 16, 2009, Office Action, mailing date Jun. 22, 2011.
U.S. Appl. No. 12/106,187, filed Apr. 18, 2009, Office Action, mailing date Jun. 24, 2011.

*Primary Examiner* — Curtis Kuntz
*Assistant Examiner* — Jesse Elbin
(74) *Attorney, Agent, or Firm* — Hickman Palermo Truong & Becker LLP (57) ABSTRACT

A method and apparatus for intelligently routing and managing audio signals within an electronic device is disclosed. The routing is responsive to a set of logical and physical policies which are stored in data tables which can be updated as needed.

50 Claims, 6 Drawing Sheets

U.S. PATENT DOCUMENTS

| | | |
|---|---|---|
| 2009/0005891 A1 | 1/2009 | Batson et al. |
| 2009/0005892 A1 | 1/2009 | Guetta et al. |
| 2009/0006671 A1 | 1/2009 | Batson et al. |
| 2009/0034750 A1 | 2/2009 | Ayoub et al. |
| 2009/0187967 A1 | 7/2009 | Rostaing et al. |
| 2011/0093620 A1 | 4/2011 | Batson et al. |

* cited by examiner

| | present? | ring tone | keypad | music |
|---|---|---|---|---|
| main speaker 104 | yes | yes | no | yes |
| headphones 112 | yes* | yes (conditional) | no | yes |
| UI speaker 124 | yes | not permitted | yes | not permitted |
| wireless 116 | no** | ---- | ---- | ---- |
| line-in line-out 120 | no | ---- | ---- | ---- |

210₁ (enabled devices and policies)

DATA-DRIVEN MEDIA MANAGEMENT WITHIN AN ELECTRONIC DEVICE

FIELD OF THE INVENTION

The present invention relates to routing audio within an electronic device using a variety of sources and outputs.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices can often handle playback of multiple types of media. The media that may be played back by computing devices often includes numerous forms/formats of video, and numerous forms/formats of audio. Within such computing devices, many applications may be competing to play back media. Examples of types of applications that may attempt to play back media within a handheld computing device include, for example, a telephone application, a web browser, an e-mail application, short message service (SMS), a music player, and video player.

Within computing devices, the various software applications that play back the media can all contend for use of the various audio resources, and have different rules and protocols for doing so. Some of these rules and protocols may conflict from one application to another.

To complicate things further, many computing devices also have multiple possible outputs for playback of the media. For example, a handheld computing device may have a line-out port, a headphone port, a docking port, and multiple speakers, each of which may serve a different function and have different capabilities.

One way to handle the contention among the applications for the playback resources of a computing device is to design each application with logic to check the state of settings of the device, and decide for itself where, when and how to play its media. Unfortunately, using this approach, each software application developer has to implement code for a behavior tree that attempts to take into account the variety of factors that can impact media playback on a device. The result may be less-than-optimal media handling decisions made by more-complex-than-necessary applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for handling media playback requests from multiple applications on a device. Rather than relying on the individual applications to make the right decisions about how their media playback needs should be handled, a centralized mechanism is provided for servicing the playback requests from the multiple applications. The centralized mechanism decides how to handle requests based on a variety of factors. Examples of the factors include what other activities are occurring within the device, an audio category, settings on the device, preferences, and what external devices are currently connected to the device. In one embodiment, the rules that govern how the centralized mechanism makes the decision based on such factors are embodied in data stored in repository accessible to the centralized mechanism, rather than hard-coded in the software components of the mechanism.

Overview of Example Handheld Device

The techniques described herein for handling the playback of media within a device may be applied to any type of electronic device for which multiple applications compete for limited playback resources. Handheld electronic devices, such as personal digital assistants and mobile phones, are merely examples of devices to which the techniques may be applied. However, for the purpose of explanation, examples of the techniques shall be given with reference to handheld devices.

Figure 1:
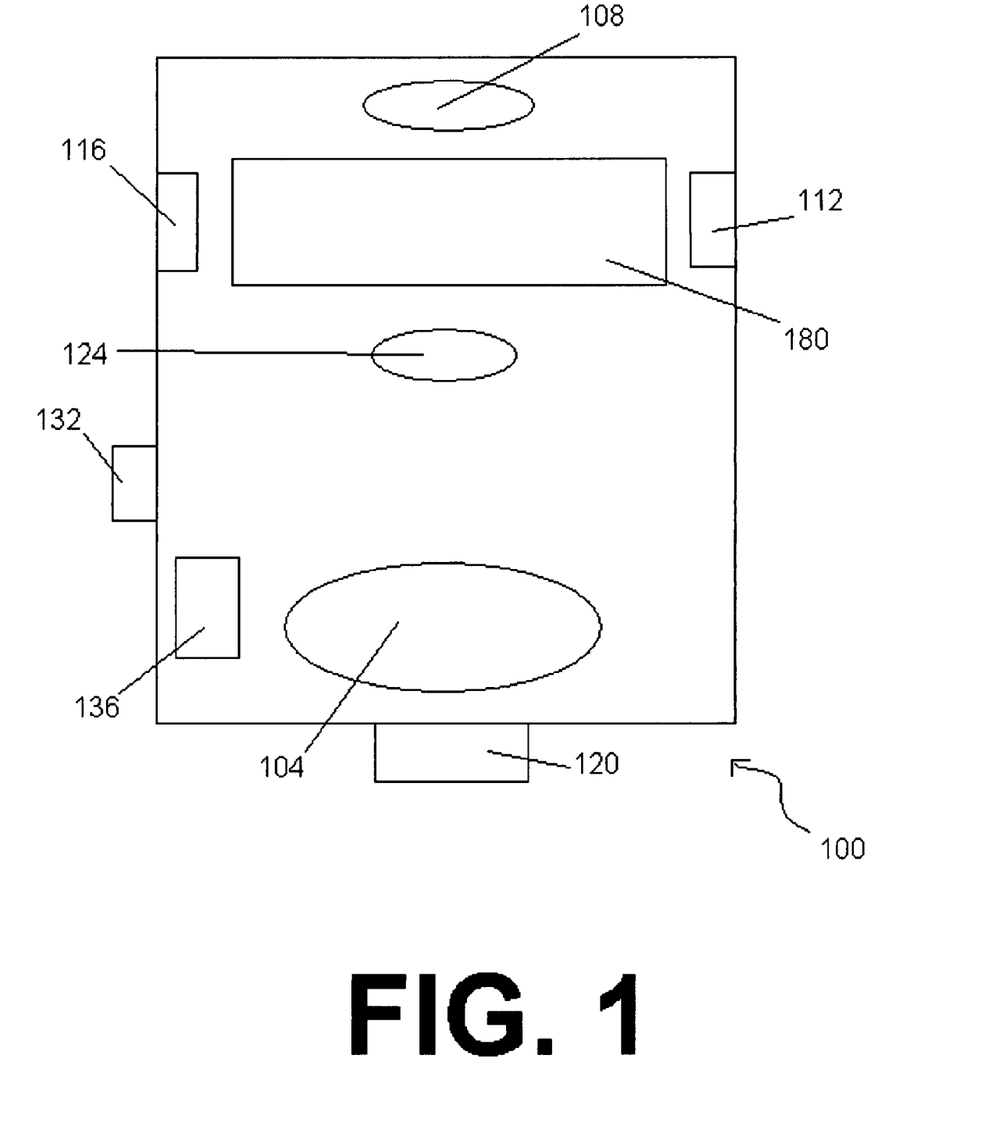
FIG. 1 is a block diagram of a handheld device upon which the present invention can be located.

FIG. 1 shows an example handheld device 100 upon which an embodiment of the present invention could be located. It is to be noted that FIG. 1 is but an example, so that devices other than that shown in FIG. 1 are also contemplated within the spirit and scope of the present invention. As shown in FIG. 1, the device 100 comprises at least a display 180 (which may or may not be touch-sensitive), a main speaker 104, a telephone receiver/speaker 108, a jack 112 for either headphones (listen only) or headset (listen and talk), a wireless transmitter/receiver 116 such as but not limited to Bluetooth®, a line out port 120 (suitable for a docking station used by e.g. larger home-audio system), and also a user interface (UI) speaker 124 (e.g. for keypad click-tones). Other types of speakers and audio ports may also be included. As stated, the device 100 is but one possible embodiment, so that the techniques described herein are not limited exclusively thereto.

The telephone receiver/speaker 108 may be similar to a receiver used within a conventional telephone. The touch-sensitive version of the display 180 may contain a keypad which in turn can generate sounds when touched.

The device 100 further comprises a mute switch 132, and a vibration means 136. A mechanism for enabling/disabling the vibration means 136 is available through the display 180 by accessing a software application loaded on the device 100.

Software applications that may be resident on the device 100 include but are not limited to e-mail, telephone, voicemail, web-browser, short messaging service (SMS), entertainment player either for music or video, camera, and slideshow (with music accompaniment).

The UI speaker 124 is intended mainly for playing keypad sounds (clicks) and notifying the user that certain steps and key-actions may be illogical or not permissible (beeps). However, under certain circumstances this policy can be overridden.

Configuration of Overall System

Figure 2:
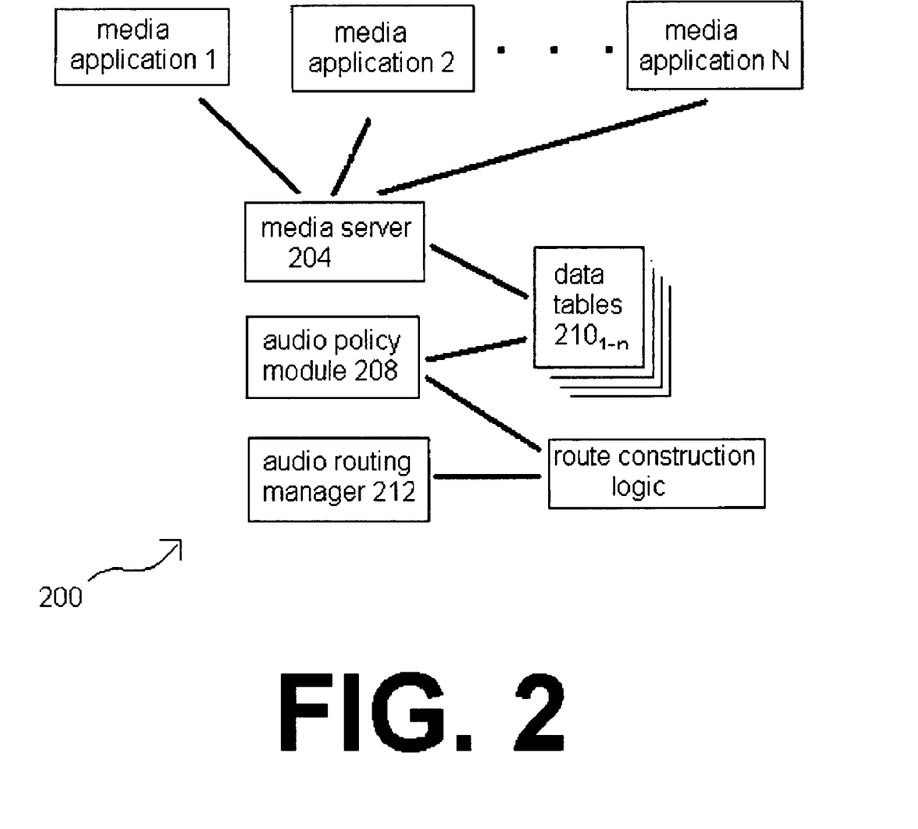
FIG. 2 is a functional overview of the present invention.

FIG. 2 shows an example system 200 for managing audio routing within an electronic device, according to one embodiment of the present invention. FIG. 2 is but one example of a possible system, and other types of arrangements could also be achieved within the spirit and scope of the present invention. Within the system 200, a media server 204 acts as an interface and coordinator with the various software applications that may need to use audio resources within the device 100.

The media server 204 achieves this partly by communicating with an audio policy manager 208 in order to determine what resources are available, and what policies exist for playing audio. The audio policy manager stores various policies and other resources in tables $210_{1\text{-}n}$. The audio routing manager 212 is responsible for determining a suitable route for the requested audio.

The system 200 also tracks what has happened in recent user history. Not just the most recent user choice ("last in"), but also second to last in, third to last in, and potentially further back.

Audio Categories

The software applications request use of audio resources within the device 100 by specifying categories of audio to the media server 204. These categories are established for media based on the intent of the media (which is different from the format and/or source of the media). Examples of potential audio categories within the system 200 include but are not limited to music, video soundtrack, voice telephone call, telephone voice mail, e-mail notification, short message service (SMS) notification, user interface sounds, ring tones, and alerts. UI sounds comprise separate sub-categories of audio, including but not limited to clicks and beeps.

Within various other devices, each software application was implementing its own decision tree by itself, somewhat inconsistently. There were also problems that the software applications were not consistent, and the user would be confused. Conversely, within the system 200, a sound category is forwarded from a software application and then managed by the media server 204.

Audio Policies

General factors used to determine how to route audio can include audio category; status of physical switch 132; available hardware (e.g. headphones, wireless), and current state of the device 100 including what media is or is not currently playing for the user. Additional factors may include the identity of the software application that has an intent to route the audio. This and other information assists in forming the audio policies that are used by the system 200.

The user interface within the device 100 seeks to avoid introducing too many choices to the user. It is also desired that the policies make sense, so that the user is never surprised, or left with the question "why did that happen?" Accordingly, a set of default policies exist per audio category. One such default is that user-initiated sounds (such as the UI keyclick sound) are muted when the mute switch 132 is enabled. Even though these sounds are expected by the user, and are not very obtrusive, if the mute switch 132 is enabled, the key clicks are not heard. This policy, like many others, is not absolute but is a default.

There are policies that also prohibit certain types of audio routing, although these policies can be over-ridden. For example, one policy is that music is unlikely to be played to the UI speaker 124. Yet another (waiveable) policy might be to not play music through the wireless speaker 116, although in certain cases music could be mixed in. These policies are not fixed and immutable, but instead part of the flexibility of matching a user interface with the hardware capabilities of a device.

However, if a telephone call is in progress (again, the system 200 always looks at what's currently occurring within the device 100), then it is reasonable to assume that only one audio route exists. This is because the user may be focused on the telephone call, and potentially unable to hear any of the other audio speakers regardless of whether they are available or not. Accordingly, if an e-mail notification comes in, it may be desirable to have a policy to mix in the e-mail notification into the telephone audio. Further, if a notification is deemed to be sufficiently important (by policy), that notification could be broadcast across all speakers.

Media Server Module

The media server module 204 is a centralized mechanism for handling audio associated with the various media-playing software applications. Accordingly, the various software applications do not need to have their own logic and resources for deciding how to manage audio. Instead, these software applications merely forward an intent to play a certain type of audio to the media server 204. As part of forwarding that intent, the software applications disclose a specific audio category to the media server 204. The software applications then depend on the media server 204 to manage the various contentions, and ensure the appropriate audio gets properly routed. Where possible, the media server 204 will honor the intent forwarded by the application, but in some cases may be forced to refuse.

The types of decisions expected of the media server 204 include but are not limited to determining: whether to play media at all, where to play it, a volume level, what specific audio media to play, whether to vibrate, whether to click, whether to blink the display 180, as well as other tasks. The media server 204 evaluates the intents forwarded by the various software applications partly by classifying the various audio requirements into audio categories.

The media server 204 centralizes and ensures consistent audio decisions that do not surprise the user. The media server 204 discerns the intent of the audio category, and then communicates the requested category to the audio routing policy module 208, which references the various data driven tables $210_{1\text{-}n}$. Whenever the user adds or removes a piece of hardware, the data tables $210_{1\text{-}n}$ are updated. Accordingly, the audio routing policy module 208 always knows what devices are connected to the system 100. The audio routing manager 212 then tells the device 100 how to play out the audio.

Audio Policy Module

The audio policy module 208 enforces policies for each of the numerous audio categories. The audio policy module 208 can use metadata-based representations of these policies within the tables $210_{1\text{-}n}$, as opposed to the policies being coded into executable logic. However, the tables $210_{1\text{-}n}$ can be code driven also.

As shown in FIG. 2, alongside both the media server 204 and the audio routing policy module 208, several data tables $210_{1\text{-}n}$ are used, thereby forming a multi-dimensional decision matrix. As the user changes their mind and preferences, the system 200 updates various of these data tables 210, while others may remain unchanged. One example of this is that the system 200 is sufficiently intelligent to distinguish headphones and headsets connected to the port 112, and to update various of the tables $210_{1\text{-}n}$ accordingly.

The policies stored in the tables $210_{1\text{-}n}$ are not rigidly enforced, but instead serve as a guide to the media server 204 and the audio policy module 208. There can be user-initiated overrides of the policies. One example is if a user plugs in headphones 112 after a wireless connection 116 has been enabled. At such a point, it would be reasonable to assume that the user wants to hear audio through the headphones 112, and not the wireless 116. This is known as "last in wins" policy. This policy exists because it is reasonable to assume that the last thing the user did to interact with the device must be what the user wants.

However, there are exceptions to the "last in wins" policy. In carrying out its responsibilities, the audio policy module 208 will review various of the data tables $210_{1-n}$. If next audio item in a data table 210 supports wireless, but the category is anti-wireless, that is, not suitable for playing over wireless (e.g. UI sounds), then the audio policy manager 208 will go step down in the queue of the tables $210_{1-n}$. The next item in the queue might be the UI speaker 124. Thus is a simple example where the "last-in wins" policy is conditional, and is not always obeyed.

Another example of this might be with regard to user overrides. For example, a software button on the display 180, might allow a user to divert a telephone call to the main speaker 104. This clear and unmistakable user choice would override other policies, including even the "last in wins" policy which normally has significant deference.

Suppose the mute switch 132 is enabled. One policy might be that user-initiated sounds e.g. typing keypad sounds may still sound, that is, be non-muted, but that non-user-initiated sounds (e.g. e-mail notifications or SMS notifications) do not sound. Setting aside the mute switch 132, another policy might be that user-initiated clicks such as typing sounds and other beeps are generally not routed to the main speaker 104.

According to one embodiment, within the system 200, there are certain policies that are unaffected by the user actions. Other tables, however, change depending on user-derived actions. When a user adds or removes something, various of the data tables $210_{1-n}$ change. Another policy is that the wireless 116 and telephone receiver 108 are unlikely choices when the audio category is music, and thus should appear as extremely low priority within the tables $210_{1-n}$, if at all.

A single policy can give rise to several choices. One example of this is if incoming e-mail notification occurs, one of the data tables 210 may hold the information "user prefers to be apprised of incoming e-mail notification". However, the specific notification means might be located in a different data table. The audio policy module 208 must then view the various data tables $210_{1-n}$ and decide: generate the notification audio, vibrate, do both, or do neither.

The audio policy module 208 stores the order in which pluggable items have come online within various of the tables 210. The audio policy module 208 also stores within the tables 210 a map of per audio-category information including whether that audio category is broadcast, whether that category obeys or ignores the ringer/mute switch 132, and a prioritized list of route construction logic. The audio policy module 208 further stores a list of outputs (both pluggable and non) which should be ignored if the ringer/mute switch 132 is enabled.

In normal use of the device 100, events happen which cause the system 200 to change audio categories. Examples of such an event might be a song ending, or a user clicking a key on the display 180. At this time, the media server 204 instructs the audio policy module 208 to change categories. The audio policy module 208 then reviews the top of the ordered list of pluggable outputs described earlier.

At this time, the audio policy module 208 also reviews the audio category in the stored map within the tables 210, and determines whether the pluggable output is stored in the prioritized list of route construction logic within the tables 210. If the output is stored therein, the audio policy module 208 selects the appropriate route description, and requests that the audio routing manager 212 commit the routes.

If the output is not stored therein, the audio policy module 208 reads the remaining items in the map of per audio-category information, and compares those items with the prioritized list of route construction logic. If the output is present, the audio policy module 208 selects the appropriate route description, and requests that the audio routing manager 212 commit the routes.

Whenever a new pluggable output becomes available, the audio policy module 208 follows a different path. The audio policy module 208 pushes the pluggable item to the top of the ordered list of outputs stored within the data tables $210_{1-n}$, and then looks up the currently applied category in the audio category map. The audio policy module 208 then determines whether the output exists in the prioritized list of route descriptions.

If the new output exists within the existing route descriptions, the module 208 outputs policy findings to the audio routing manager 212, and requests that the manager 212 commit the routes.

Using a different example, suppose the user wants to listen to music. The audio policy module 208 will look at what outputs are connected, as well as the device priorities associated with music playback. The audio policy module 208 may note that e.g. both headphones as well as the main speaker are connected and available for playback. The audio policy module 208 will then check down a data table holding priority information associated with the music category. The first priority may be the line out port 120, but that feature is not currently connected.

The audio policy module 208 will then proceed down the priority list. The next item may be the headphones 112, while main speaker 104 may be the third item in the priority list. The audio routing policy module 208 will then choose headphones for the user, and mute the main speaker 104. However, the present invention should not be considered as limited exclusively to this suggested choice, which is for exemplary purposes only. There may be instances in which it is desired to enable the main speaker 104 simultaneously with the headphones 112.

Figure 3A:
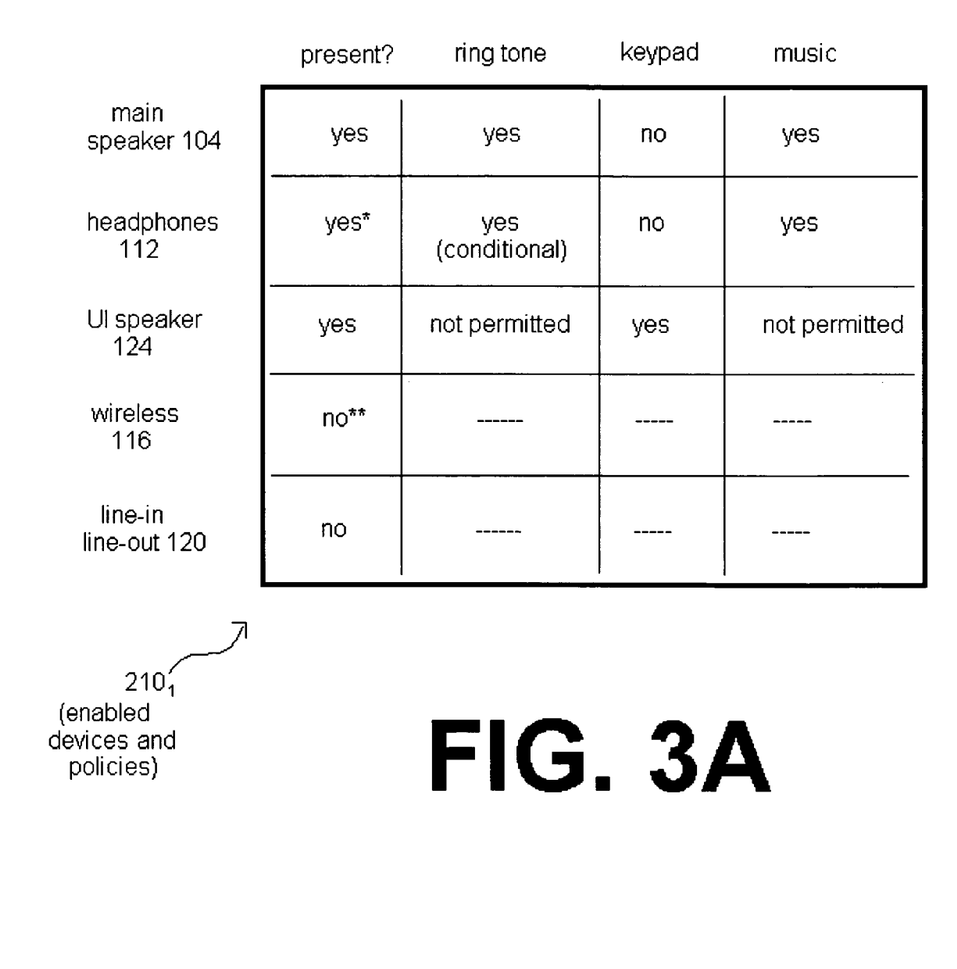
FIGS. 3A and 3B are example data tables according to an embodiment of the invention.

To further illustrate this, an example data table $210_1$ holding some abbreviated policy information is shown in FIG. 3A. An actual data table 210 could differ significantly from that shown in FIG. 3A, so that the present invention should not be considered as limited exclusively thereto. For purposes of brevity, only five of the audio outlets within the device 100 are shown although numerous others exist. Similarly, only three types of audio categories are shown although again numerous others exist.

In maintaining the table $210_1$, the status of the various audio outlets is continually polled and updated by the system 200. Consequently, the first column is "present?", meaning is the specific audio outlet present, enabled, and available for use. In the example shown, the main speaker 104, headphones 112, and UI speaker 124 are present, and the asterisk at the headphones 112 means that it was "last in". Meanwhile, the wireless 116 and line out 120 outputs are not present, and thus not available for use. However, the wireless 116 is shown with two asterisks, symbolizing it was "second to last in". As stated, the various tables $210_{1-n}$ work together to store data about user history.

The next three columns show three types of audio categories, and whether they can be played on the five outlets, according to policy of the system 200. Priority information is intentionally not shown in the data table $210_1$, but instead only policy. An example priority sequence is instead shown in the data table $210_2$. However, these storage mechanisms are but for exemplary purposes only, so that the present invention should not be considered as limited exclusively thereto.

Starting with keypad audio, it has already been stated that keypad noises are generally only to be played over the UI speaker 124, and not through the main speaker 104 or headphones 112. Exceptions can exist, but this is the general policy. Because the wireless 116 and line out 120 are not enabled, no data is readable, so that no policy is indicated.

Meanwhile, ring tones can be played through the main speaker 104, and potentially through the headphones 112, but only under certain policy conditions. To determine what those policy conditions are, it might be necessary to view data from one of the other tables $210_{2-n}$. Finally, ring tones should not be played through the UI speaker 124 as general policy.

The last category of FIG. 3A is music, which can be played on the main speaker 104 or the headphones 112, but as general policy is not playable on the UI speaker 124.

Figure 3B:
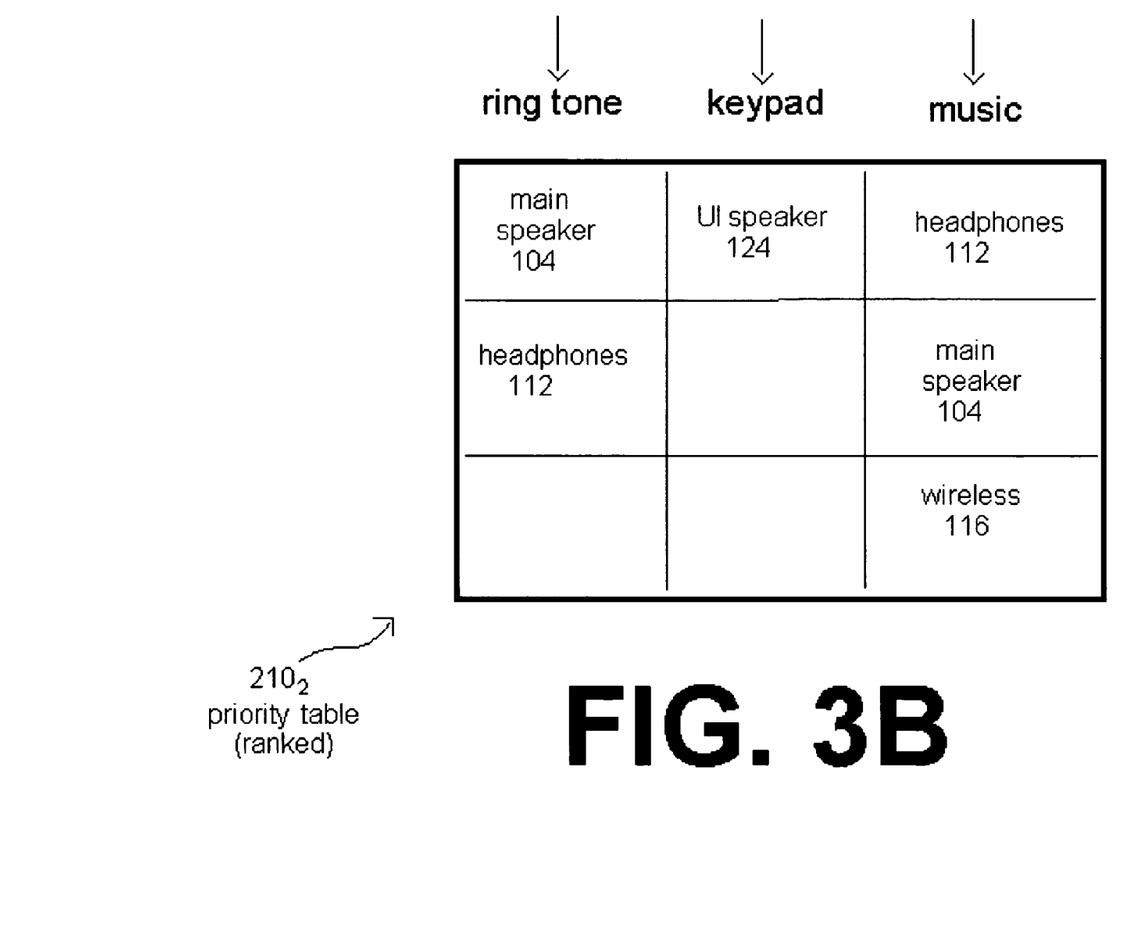

As stated, FIG. 3B shows an example priority data table $210_2$. For consistency, FIG. 3B has the same example audio categories as FIG. 3A, with various audio outlets ranked in order of priority should one of these audio categories occur. Again, like with FIG. 3A, FIG. 3B is abbreviated, truncated, and simplified for purposes of brevity, so that the present invention should not be considered as limited exclusively thereto. According to the data table $210_2$, if a ring tone occurs, the first priority would be to play it over the main speaker 104. However, if the main speaker 104 is not available, then the system 200 should play the ring tone over the headphones 112.

Similarly, if a keypad noise occurs, the audio associated therewith should be played over the UI speaker 124. The general policy is to not store a second choice for this category.

Continuing the example of FIG. 3B, if music occurs, the first choice should be the headphones 112, but if that is not available the second choice the main speaker 104, and if those are not available the third would be the wireless 116. The presence of the wireless 116 might be stored in the data table $210_2$ despite the fact that the data table $210_1$ shows that the wireless 116 is disconnected. One reason for this presence could be recent usage history, specifically that the user recently used the wireless 116 and thus may use it again.

In both example data tables $210_1$ and $210_2$, it is to be noted that the policies and priorities are not absolute, but instead are suggested. Under certain circumstances they both can be overridden.

The system 200 sets up route construction logic. This can be achieved by doing a series of appends of small steps to form a complete path. In one embodiment of the invention, the route construction logic is formed by using a type of grammar. This grammar can have varying degrees of complexity. A simpler embodiment of the invention would be to have grammar describing source and destination only (direct path). However, there could be problems or conflicts in how the audio arrives at its intended destinations. Thus, the audio policy module 208 may need to intelligently make routing decisions through a variety of audio signal processors, which goes beyond source and destination and also contemplates intermediate points (indirect path). Thus, the route construction grammar contemplates both direct path and indirect path situations. The embodiment of the invention which contemplates intermediate points and indirect paths has the advantage that it removes uncertainty over routing.

Another advantage of route construction logic including intermediate steps is that it can all be held in data tables. Without the intermediate steps, an audio routing manager must infer a route only from endpoints (source and destination). It is preferable to avoid such inferences. This is partly because a device 100 may implement its audio strategy through a variety of signal processing components.

Figure 4:
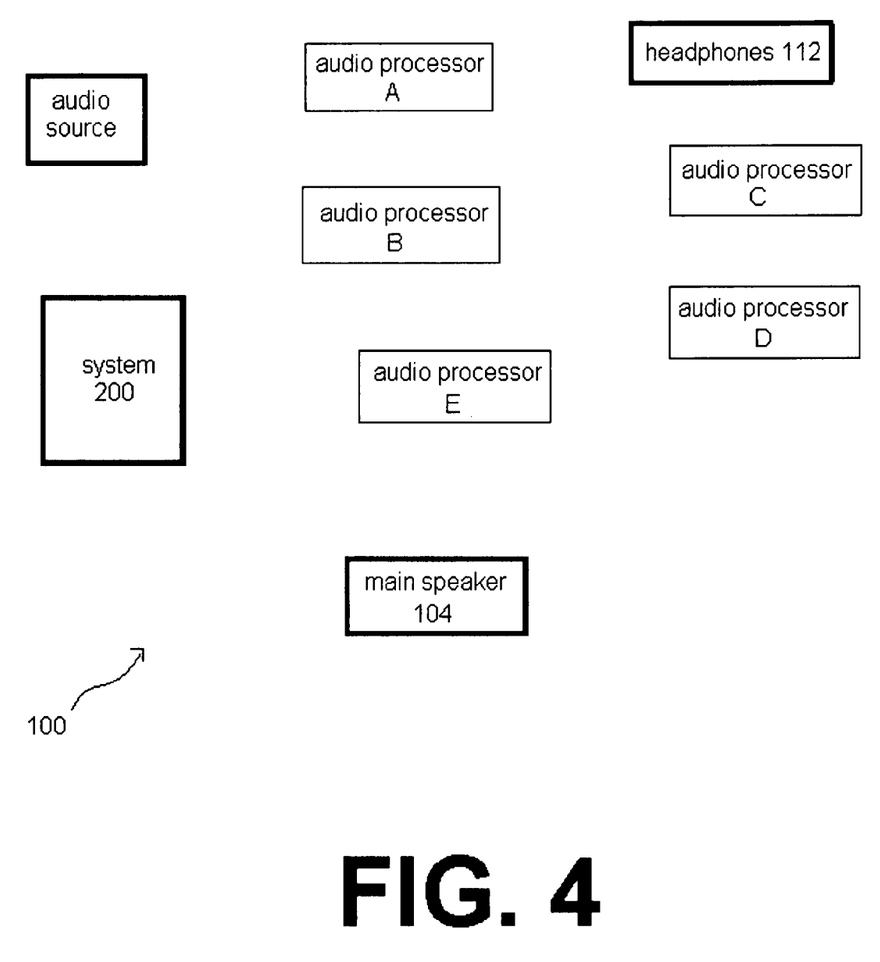
FIG. 4 is a block diagram of an example audio hardware arrangement according to an embodiment of the invention.

An example of how the system 200 would achieve this is shown in FIG. 4, which shows a group of audio processors A, B, C, D, and E. Any or all of these audio processors may have codec capabilities, and may also have baseband features. It is to be noted that FIG. 4 is a block diagram version of only a portion of the audio capabilities of the device 100, and is simplified for the purposes of brevity. In FIG. 4 an audio source is shown.

For purposes of example, within FIG. 4 it will be assumed that the system 200 is responsible for deciding how to route audio from the source to either the main speaker 104, the headphones 112, or both. An example of route construction logic that would be direct path is:

audio source-main speaker 104.

An example of route construction logic that would be indirect path is: audio source-audio processor A-audio process D-main speaker 104.

Another example of route construction logic forming an indirect path is:

audio source-audio processor A-audio process D-audio process C-main speaker 104 AND headphones 112.

Audio Routing Manager

As shown above, the audio policy module 208 makes policy findings by comparing audio category data to data about currently attached devices, as well as other criteria including but not limited to policies. Then, the audio routing manager 212 executes playback based on these policy findings. The audio routing manager 212 can achieve this by a variety of means.

The audio routing manager 212 is also responsible for removing unwanted pops and other noises, volume-matching, and potentially mixing audio. One way to achieve this is to ramp up when potential problems or aberrational sounds are suspected, thereby preventing unwanted pop sounds due to spikes.

The system 200 also takes precautions with regard to the volume of audio being played. It is important for a volume selection to only affect the appropriate audio, and not affect other audio. For example, it is possible a user wishes to only change the volume of audio stream being routed to the headphones 112, but not change the volume of any audio that may be routed to the main speaker 104. To address this, the system 200 reviews the various tables $210_{1-n}$, and determine which of the audio categories is in use at a given time. At that point, the audio routing manager 212 ensures that the specific category in use is the only one which the volume selector gets linked to.

A user may have set the main speaker 104 to a lower volume, for softer music, but a policy might to make a ringtone much louder than the music. The audio routing manager 212 is responsible for implementing such a volume difference.

A user may also make a choice of volume levels that is inappropriate. A capping policy can also be implemented, where a maximum volume is imposed under certain circumstances, regardless of a user's selection. The audio routing manager 212 is responsible for implementing this volume limitation.

Another policy is to "duck" a first audio stream, such as music, in order to temporarily increase emphasis on a second audio stream, such as a ring tone. As stated, the "duck" feature is meant to temporary. When the second audio event has finished, the first audio stream is restored to its original volume. The system 200 is responsible for implementing ducking, and information about which audio categories to duck, and under what circumstances, is stored in the data tables $210_{1-n}$.

The audio routing manager 212 interprets the policy findings of the audio policy module 208, to ensure they make sense. The audio routing manager 212 has the ability to report back to the audio policy module 208 that certain policy findings cannot be implemented. In the case where they can be implemented, the audio routing manager 212 will then decide how to route the audio through the appropriate audio signal processing hardware, as shown in FIG. 4. For example, audio for the headphones 112 may be processed by different audio processors than audio routed to the main speaker 104.

Another issue is that at any given time during a playback of audio, various and perhaps all of these audio processors A-E can have input on the volume of that audio as heard by the user. A volume adjustment capacity comes within many audio processors. Although only five audio processors are shown in FIG. 4, within any particular device 100 there may be a large number of audio processors. Consequently, knowing every step from source to destination makes it easier for the audio routing manager 212 to manage all volume levels along the route, thereby assuring an appropriate playback experience, with no sudden spikes in volume.

Additional features of the system 200 can be explained by providing examples. Suppose that a user connects a wireless headset to the device 100. The media server 204, the audio routing policy 208, and the audio routing manager 212 would "find" the wireless device, and connect it to both uplink (source) and downlink (playback) paths. In this example it will be assumed that the user wishes to hear music through the wireless headset 112, although that may not always be the case.

Now suppose the user receives a telephone call. The audio policy module 208 would first decide how to route the ring tone, and then how to route the telephone audio. After obtaining the policy findings from the audio policy module 208, the audio routing manager 212 would in turn go into action determining how to route first the ring tone and then the telephone audio.

This process is achieved as follows. The audio policy module 208 first checks one of the data tables $210_{1-n}$, and learn that the wireless headset 116 is connected, but that the telephone receiver speaker 108 also is connected. The audio policy module 208 then checks a priority table, and determines that the wireless 116 is a higher priority than the telephone receiver speaker 108. The audio policy module 208 would then forward these logical findings to the audio routing module 212, which would then select a route for the audio and build the route construction logic to facilitate that route.

When the route construction logic is complete, the audio routing manager 212 might indicate to the media server 204 a "ready" signal, signifying that a route is available and ready for use. The media server 204 could then accept a software application's intent to play audio. However, the software applications need to understand that such acceptance is always temporary, and subject to various changes.

As stated, the system 200 always knows what's currently happening within the device 100, for example that user is in a telephone call, or that music is playing. Thus, the media server 204 by itself doesn't allow changing of routing for existing audio, but may request that the audio routing manager 212 mix in other audio with the current category, such as UI audio or some type of notification, with the audio that is currently playing. This is convenient because the media server 204 can make this request without checking with the audio routing manager to ensure that a route exists.

Another feature of the audio routing module is to play ring-tone out the main speaker 104, headphones 112, and the line out 120. A policy may exist in which it is desired to play through all speakers, due to desire to not miss a telephone call. This may be suitable in an instance where, for example, the headphones 112 are plugged into the device 100, but not on the user's ears. Thus, the audio routing module also has provision for a "broadcast route", that is, play through every possible speaker that is available.

Hardware Implementation

Figure 5:
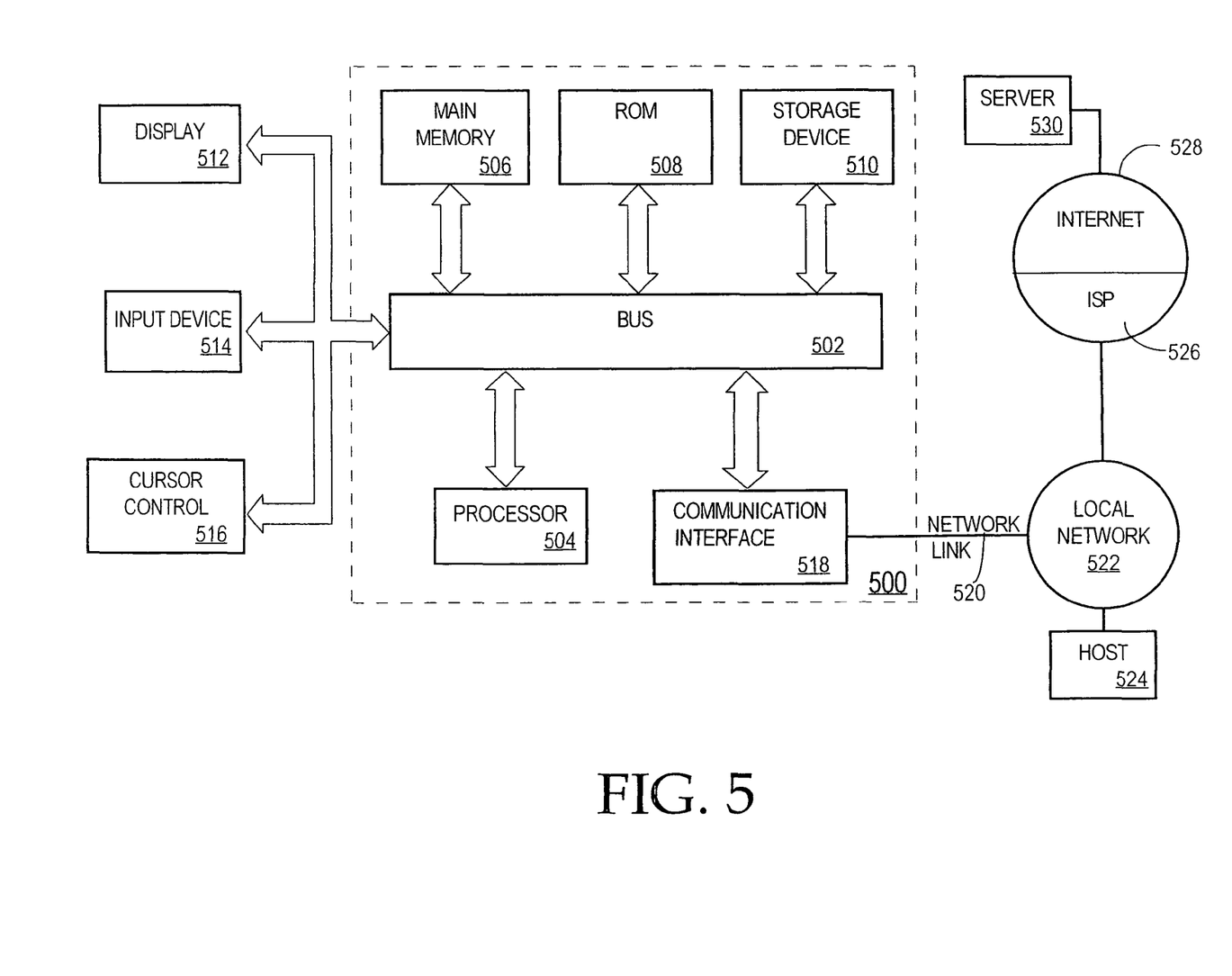
FIG. 5 is a block diagram of a computer system according to an embodiment of the invention.

The approaches described herein may be implemented on any type of computing platform or architecture. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 500, various computer-readable media are involved, for example, in providing instructions to processor 504 for execution. Such a medium may take many forms, including but not limited to, non-volatile media, and volatile media. Non-volatile media includes, for example, optical or magnetic disks, such as storage device 510. Volatile media includes dynamic memory, such as main memory 506.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, a modem, or some type of wireless connection such as but not limited to WiFi, to provide a data communication connection to a corresponding type of telephone line. As another example, communication interface 518 may be a local area network (LAN) card to provide a data communication connection to a compatible LAN. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave. The computer system 500 may be a handheld device, may be powered by a battery, and may have a touchscreen.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of managing media on an electronic device, comprising:

receiving media playback requests from a plurality of applications executing on the electronic device;

wherein the media playback requests indicate categories for media associated with the media playback requests and do not indicate the applications that issued the media playback requests; and determining how to route media associated with the media playback requests based, at least in part, on the categories indicated by the media playback requests, wherein the method is performed by one or more computing devices.

2. The method of claim 1, further comprising:

determining a current usage status of the electronic device; and the step of determining how to route media is based, in part, on the current usage status of the device.

3. The method of claim 2, wherein the current usage status further comprises which of a plurality of outputs have been plugged into the electronic device.

4. The method of claim 3, wherein the current usage status further comprises the order in which the plurality of outputs have been plugged into the electronic device.

5. The method of claim 1, wherein the step of determining how to route further comprises determining whether to direct the media to no output of the electronic device or to all outputs of the electronic device.

6. The method of claim 1, wherein the step of determining how to route further comprises determining what media to play.

7. The method of claim 1, wherein the step of determining how to route further comprises determining whether to blink a display, enable a vibration means, or direct the media to one of the plurality of outputs.

8. The method of claim 1, wherein the step of determining how to route further comprises determining a volume setting at which to play back the media.

9. The method of claim 1, wherein the step of determining how to route further comprises:

obtaining a status of one or more physical switches present on the electronic device; and determining how to route is based on the status of the one or more physical switches.

10. The method of claim 1, further comprising:

performing volume-matching among a plurality of audio processors.

11. The method of claim 1, further comprising:

mixing audio from the plurality of applications.

12. The method of claim 1, further comprising:
ensuring that an audio volume selection is matched with an appropriate category.

13. The method of claim 1, further comprising:
imposing a capping policy where a maximum volume is imposed regardless of a user's choice of volume selection.

14. The method of claim 1, further comprising:
lowering the volume of a first audio stream in order to temporarily increase emphasis on a second audio stream.

15. The method of claim 1, wherein the categories include at least one category drawn from the set consisting of: music, video soundtrack, voice telephone call, telephone voice mail, e-mail notification, SMS notification, user interface sounds, ring tones, and alerts.

16. The method of claim 1, wherein:
two media requests originate from a particular application of the plurality of applications; and
the two media requests designate different categories.

17. The method of claim 1, wherein:
the media associated with the media playback requests is audio; and
determining how to route media associated with the media playback requests involves determining how to route the audio associated with the media playback requests.

18. The method of claim 1, wherein the steps of receiving and determining are performed by a set of one or more media components that are separate from the plurality of applications.

19. The method of claim 18, wherein determining how to route comprises determining, by the set of one or more media components, based on one or more policies indicated in policy data.

20. The method of claim 19, wherein determining how to route comprises changing the one or more policies by updating the policy data without modifying executable code of the set of one or more media components.

21. The method of claim 19, further comprising:
establishing a set of default policies for each category of said categories; and
storing the set of default policies in association with the policy data.

22. The method of claim 19, further comprising:
establishing a set of policies that prohibit audio routing to predetermined outputs; and
storing the set of policies in association with the policy data.

23. The method of claim 19, further comprising:
discerning the intent of an audio category in a media playback request based on the policy data.

24. The method of claim 19, further comprising:
overriding policies indicated in the policy data based on user behavior.

25. The method of claim 19, further comprising:
storing a last in wins policy in association with the policy data.

26. One or more storage media storing instructions which, when executed by one or more processors, cause:
receiving media playback requests from a plurality of applications executing on an electronic device;
wherein the media playback requests indicate categories for media associated with the media playback requests, wherein the categories that are indicated in the media playback requests do not indicate the applications from which the media playback requests were received; and
determining how to route media associated with the media playback requests based, at least in part, on the categories indicated by the media playback requests.

27. The one or more storage media of claim 26, wherein the instructions, when
executed by the one or more processors, further cause:
determining a current usage status of the electronic device; and
the step of determining how to route media is based, in part, on the current usage status of the electronic device.

28. The one or more storage media of claim 27, wherein the current usage status further comprises which of a plurality of outputs have been plugged into the electronic device.

29. The one or more storage media of claim 28, wherein the current usage status further comprises the order in which the plurality of outputs have been plugged into the electronic device.

30. The one or more storage media of claim 26, wherein the step of determining how to route further comprises determining whether to direct the media to no output of the device or to all outputs of the electronic device.

31. The one or more storage media of claim 26, wherein the step of determining how to route further comprises determining what media to play.

32. The one or more storage media of claim 26, wherein the step of determining how to route further comprises determining whether to blink a display, enable a vibration means, or direct the media to one of the plurality of outputs.

33. The one or more storage media of claim 26, wherein the step of determining how to route further comprises determining a volume setting at which to play back the media.

34. The one or more storage media of claim 26, wherein the step of determining how to route further comprises:
obtaining a status of one or more physical switches present on the electronic device; and
determining how to route is based on the status of the one or more physical switches.

35. The one or more storage media of claim 26, wherein the instructions, when executed by the one or more processors, further cause:
performing volume-matching among a plurality of audio processors.

36. The one or more storage media of claim 26, wherein the instructions, when executed by the one or more processors, further cause:
mixing audio from the plurality of applications.

37. The one or more storage media of claim 26, wherein the instructions, when executed by the one or more processors, further cause:
ensuring that an audio volume selection is matched with an appropriate category.

38. The one or more storage media of claim 26, wherein the instructions, when executed by the one or more processors, further cause:
imposing a capping policy where a maximum volume is imposed regardless of a user's choice of volume selection.

39. The one or more storage media of claim 26, wherein the instructions, when executed by the one or more processors, further cause:
lowering the volume of a first audio stream in order to temporarily increase emphasis on a second audio stream.

40. The one or more storage media of claim 26, wherein the categories include at least one category drawn from the set consisting of: music, video soundtrack, voice telephone call, telephone voice mail, e-mail notification, SMS notification, user interface sounds, ring tones, and alerts.

41. The one or more storage media of claim 26, wherein:
two media requests originate from a particular application of the plurality of applications; and
the two media requests designate different categories.

42. The one or more storage media of claim 26, wherein:
the media associated with the media playback requests is audio; and
determining how to route media associated with the media playback requests involves determining how to route the audio associated with the media playback requests.

43. The one or more storage media of claim 26, wherein the steps of receiving and determining are performed by a set of one or more media components that are separate from the plurality of applications.

44. The one or more storage media of claim 43, wherein determining how to route comprises determining, by the set of one or more media components, based on one or more policies indicated in policy data.

45. The one or more storage media of claim 44, wherein determining how to route comprises changing the one or more policies by updating the policy data without modifying executable code of the set of one or more media components.

46. The one or more storage media of claim 44, wherein the instructions, when executed by the one or more processors, further cause:
establishing a set of default policies for each category of said categories; and
storing the set of default policies in association with the policy data.

47. The one or more storage media of claim 44, wherein the instructions, when executed by the one or more processors, further cause:
establishing a set of policies that prohibit audio routing to predetermined outputs; and
storing the set of policies in association with the policy data.

48. The one or more storage media of claim 44, wherein the instructions, when executed by the one or more processors, further cause:
discerning the intent of an audio category in a media playback request based on the policy data.

49. The one or more storage media of claim 44, wherein the instructions, when executed by the one or more processors, further cause:
overriding policies indicated in the policy data based on user behavior.

50. The one or more storage media of claim 44, wherein the instructions, when executed by the one or more processors, further cause:
storing a last in wins policy in association with the policy data.

* * * * *